United States Patent [19]

Yukuta et al.

[11] 4,058,503
[45] Nov. 15, 1977

[54] PROCESS FOR PREPARING ORGANIC SOLVENT-SOLUBLE POLY(AMIDE-IMIDE)

[75] Inventors: Toshio Yukuta, Kodaira; Takashi Ohashi, Iruma; Masumi Saito, Tanashi; Katsuhiko Arai, Kodaira, all of Japan

[73] Assignee: Bridgestone Tire Company Limited, Tokyo, Japan

[21] Appl. No.: 548,841

[22] Filed: Feb. 10, 1975

[30] Foreign Application Priority Data

Feb. 8, 1974 Japan .................................. 49-15399

[51] Int. Cl.$^2$ ........................ C08G 73/08; C08G 73/14
[52] U.S. Cl. ........................... 260/47 CP; 260/47 UA; 260/50; 260/63 N; 260/65; 260/75 N; 260/78 UA; 260/78 TF
[58] Field of Search ................... 260/63 N, 47 CP, 65, 260/78 TF, 75 N, 47 UA, 78 UA, 50

[56] References Cited

U.S. PATENT DOCUMENTS

| 3,360,502 | 12/1967 | Loncrini | 260/78 |
| 3,882,086 | 5/1975 | Schimmel et al. | 260/65 |

Primary Examiner—Lester L. Lee
Attorney, Agent, or Firm—Sughrue, Rothwell, Mion, Zinn and Macpeak

[57] ABSTRACT

A thermoplastic and organic solvent-soluble poly(amide-imide) elastomer having a number average molecular weight ranging from 10,000 to 100,000, prepared by reacting (1) an acid anhydride functional polymer, represented by the following formula

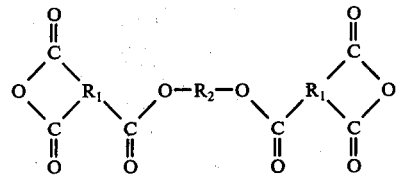

or a mixture of said acid anhydride functional polymer (1) and a tetracarboxylic acid dianhydride, with (2) a dicarboxylic acid dihydrazide in the presence of an aprotic dipolar solvent at a temperature ranging from $-10°$ C to $30°$ C.

14 Claims, No Drawings

PROCESS FOR PREPARING ORGANIC SOLVENT-SOLUBLE POLY(AMIDE-IMIDE)

BACKGROUND OF THE INVENTION

1. Field of the Invention

The present invention relates to a novel thermoplastic and organic solvent-soluble poly(amide-imide) elastomer and the process for producing the same.

2. Description of the Prior Art:

The demand for elastomer having an excellent heat resistance is recently increasing for many fields of industrial uses.

Polyimide and poly(amide-imide) are well known as an excellent heat resistant resin and are ordinarily prepared by a two-step process, in which the first step is accomplished by reacting a tetracarboxylic acid dianhydride or a tricarboxylic acid anhydride monohalide with a nitrogen containing compound having active hydrogens, such as diamino compound or dicarboxylic acid dihydrazide, to obtain a polyamic acid as a precursor, and the second step is accomplished by treating the resulting precursor with a dehydrating agent, such as a mixture of acetic acid anhydride and pyridine, or by heating the precursor to convert the polyamic acid to the cyclic polyimide. However, the resulting heat resistant polyimide or poly(amide-imide) is insoluble in organic solvents and cannot be casted into shaped articles. Moreover, it has never been used as elastomeric materials for the lack of elastomeric properties. In one example of the use of conventional heat resistant polyimide or poly(amide-imide) as film or coating materials, a precursor, that is an organic solvent-soluble polyamic acid is casted into film or coated on the object, thereafter these films or coating is subjected to dehydration and ring-closure reactions at high temperature to obtain infusible, organic solvent-insoluble and rigid polyimide or poly(amide-imide) film.

The inventors succeeded to produce a novel thermoplastic and organic solvent-soluble poly(amide-imide) elastomer by a novel one-step process using an acid anhydride functional polymer under restricted conditions.

SUMMARY OF THE INVENTION

According to the present invention, there is provided a thermoplastic and organic solvent-soluble poly(amide-imide) elastomer having a number average molecular weight ranging from 10,000 to 100,000, prepared by reacting (1) an acid anhydride functional polymer represented by the following formula

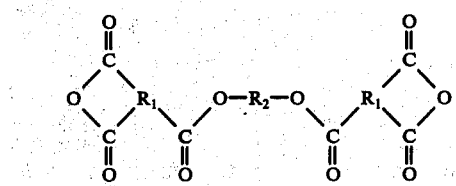

or a mixture of the acid anhydride functional polymer (1) and a tetracarboxylic acid dianhydride with (2) a dicarboxylic acid dihydrazide.

According to another aspect of the present invention, there is provided a process for producing said thermoplastic and organic solvent-soluble poly(amide-imide) elastomer in the presence of an aprotic dipolar solvent at a temperature ranging from $-10°$ C to $30°$ C.

It is an object of the present invention to provide a thermoplastic and organic solvent-soluble poly(amide-imide) elastomer. None of conventional polyimide or poly(amide-imide) is thermoplastic, organic solvent-soluble and elastomeric.

It is another object of the present invention to provide organic solvent-soluble elastomeric materials having a high strength and an excellent heat resistance, which can be casted into elastomeric film or shaped articles and also be moulded by extrusion, injection or the other shaping methods.

It is a further object of the present invention to provide a novel process for producing a thermoplastic and organic solvent-soluble poly(amide-imide) elastomer.

According to the present invention, said novel poly(amide-imide) elastomer can be easily obtained with high efficiency by one-step process under mild reaction condition.

DETAILED DESCRIPTION OF THE PREFERRED EMBODIMENT

The acid anhydride functional polymer (1) to be used in the present invention is prepared by the following method. That is, it is ordinarily prepared by reacting excess moles of a tricarboxylic acid anhydride monohalide represented by the following formula (I)

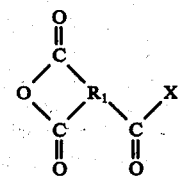

wherein $R_1$ represents a trivalent hydrocarbon radical having at least 2 carbon atoms and X represents a halogen radical, with a hydroxyl functional polymer having a number average molecular weight ranging from 700 to 10,000 and having two hydroxyl groups at chain terminals or chain branches, and represented by the following formula (II)

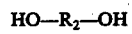

$$HO-R_2-OH \qquad (II)$$

wherein $R_2$ represents a hydroxyl functional polymer radical. The reaction proceeds as illustrated by the following reaction scheme (III).

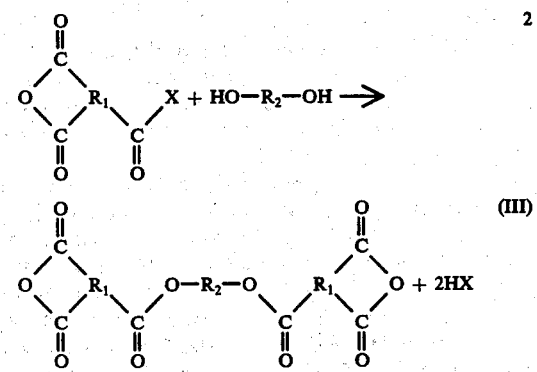

As illustrated above, in the step of preparing the acid anhydride functional polymer, hydrogen halide generates as a by-product, and it is necessary to remove the by-product because it may markedly retard the reaction of the next step. In the present invention, it is preferable to carry out the reaction in a solvent inert to both of the reactants in the presence of a hydrogen halide acceptor.

As the tricarboxylic acid anhydride monohalide to be used in preparing said acid anhydride functional polymer (I), any compounds represented by the formula (I) may be useful. Among them, aromatic tricarboxylic acid anhydride monohalides are preferable.

As these compounds, there may be used trimellitic acid anhydride monohalide and monohalides of tricarboxylic acid anhydrides, such as 1,2,3-benzene tricarboxylic acid anhydride, 2,2',3-biphenyl tricarboxylic acid anhydride, 3,4,4'-biphenyl tricarboxylic acid anhydride, 3,4,4'-diphenylmethane tricarboxylic acid anhydride, 3,4,4'-diphenylether tricarboxylic acid anhydride, 3,4,4'-benzophenone tricarboxylic acid anhydride, 1,2,4-naphthalene tricarboxylic acid anhydride, 2,3,6-naphthalene tricarboxylic acid anhydride, 1,4,5-naphthalene tricarboxylic acid anhydride, 2,3,5-naphthalene tricarboxylic acid anhydride, 2-(3,4-dicarboxyphenyl)-2-(3-carboxyphenyl)propane anhydride, 2,3,5-pyrazine tricarboxylic acid anhydride, 2-(2,3-dicarboxyphenyl)-2-(3-carboxyphenyl)propane anhydride, 1-(2,3-dicarboxyphenyl)-1-(3-carboxyphenyl)ethane anhydride, 1-(3,4-dicarboxyphenyl)-1-(4-carboxyphenyl)ethane anhydride, (2,3-dicarboxyphenyl)(2-carboxyphenyl)methane anhydride, 3,3',4-tricarboxybenzophenone anhydride and the like. Among them, trimellitic acid anhydride monohalide is preferable. More preferably, compounds represented by the formula (I), in which X is a chlorine radical, may be used.

As the hydroxyl functional polymer represented by the formula (II) to be used in preparing said acid anhydride functional polymer (1), any type of polyols in the form of an isolated compound or of a reaction intermediate may be used. As the polyols, there may be used polyether glycol, polyester glycol, polyester ether glycol and polyolefin glycol.

As the polyether glycols, there may be used polyoxyethylene glycol, polyoxypropylene glycol and polyoxytetramethylene glycol, which are prepared, respectively, by ring opening addition polymerization of ethylene oxide or propylene oxide or their mixtures in the presence of a low molecular weight compound having two active hydrogens and an anionic catalyst as an initiator or by ring opening addition polymerization of tetrahydrofuran in the presence of a cationic catalyst.

As the polyester glycols, there may be used polyester glycols obtained by dehydration condensation reaction between polybasic organic acids, such as oxalic acid, succinic acid, gultaric acid, adipic acid, maleic acid, phthalic acid and the like, and glycols, such as ethylene glycol, diethylene glycol, propylene glycol, butylene glycol, hexane glycol and the like. Among them, polyethylene adipate glycol and polyethylene phthalate glycol are preferably used.

As the polyolefin glycols, there may be used polydiene glycols, such as polybutadiene glycol and polyisoprene glycol, which are prepared by treating a polydiene homopolymer or a copolymer prepared by radical polymerization catalyzed by hydrogen peroxide or low molecular weight azo compounds having hydroxyl groups or by anionic polymerization, well known as living polymerization, catalyzed by alkaline metal compounds, with ethylene oxide, ethylene chlorohydrin or epichlorohydrin. Polydiene glycols may also be prepared by reducing ozonides of high polymers containing olefinic unsaturated double bonds ranging from 2 to 100 weight percent in the main chain or side chain, such as polybutadiene, polyisoprene, butadiene-styrene rubber, butadiene-acrylonitrile rubber, butadiene-acrylic acid ester copolymer and ethylene-propylene diene terpolymer and the like, with conventional reducing agents, such as lithium aluminium hydride, sodium borohydride, bis(2-methoxyethoxy)sodium aluminum hydride and the like.

However, the hydroxyl functional polymers (II) to be used in the present invention are limited to those having a number average molecular weight ranging from 700 to 10,000 as described above. When ones having a number average molecular weight of less than 700 as the hydroxyl functional polymer are used, objective elastomeric materials cannot be obtained, and when ones having a number average molecular weight of more than 10,000 are used, the workability at shaping process is difficult owing to the high viscosity of the resulting polymer before curing.

The reaction between the tricarboxylic acid anhydride monohalide (I) and the hydroxyl functional polymer (II) is ordinarily carried out at a temperature ranging from −50° C to 100° C in the presence of a hydrogen halide acceptor described below.

The dicarboxylic acid dihydrazides (2) to be used in the present invention are aliphatic, alicyclic, aromatic and heterocyclic dicarboxylic acid dihydrazides. As the dicarboxylic acid dihydrazides, there may be used oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, cyclohexane dicarboxylic acid dihydrazide, phthalic acid dihydrazide, isophthalic acid dihydrazide, terephthalic acid dihydrazide, naphthalene dicarboxylic acid dihydrazide, dimer acid dihydrazide, oxavaleric acid dihydrazide, tetradecanedioic acid dihydrazide, decamethylene dicarboxylic acid dihydrazide, brassylic acid dihydrazide, octadecane-1,18-dicarboxylic acid dihydrazide, eicosane-1,20-dicarboxylic acid dihydrazide, piperazine dicarboxylic acid dihydrazide, 3,9-bis(2-hydrazidoethyl)-2,4,8,10-tetraoxaspiro[5,5]undecane and their mixtures. Among them, adipic acid dihydrazide, isophthalic acid dihydrazide and 3,9-bis(2-hydrazidoethyl)-2,4,8,10-tetraoxaspiro[5,5]undecane are preferably used.

The equivalent ratio of the acid anhydride functional polymer (1) to the dicarboxylic acid dihydrazide (2) is preferably about 1/1. And the excess at most 5% of any one component to another in equivalent ratio may safely be used. However, when more than 5% excess of anyzone component to another in equivalent ratio is used, the molecular weight of the resulting elastomer are low and the physical properties of the elastomeric materials are not satisfactory.

As the solvent to be used in the present invention, it is required to employ one which can dissolve at least one component to be used in the present invention. As such solvents, there may be used aprotic dipolar solvents, such as dimethyl formamide, diethyl formamide, dimethyl acetamide, diethyl acetamide, N-methyl-2-pyrrolidone, N-ethyl-2-pyrrolidone, hexamethylphosphoro triamide, dimethyl sulfoxide, acetonitrile, benzonitrile, nitromethane, nitroethane, nitrobenzene, sulfolane and their mixtures. Among them, it is preferable to use dimethyl acetamide or mixture solvents containing dimethyl acetamide as one component.

The reaction of the present invention may be carried out at a temperature ranging from −10° C to 30° C and preferably at a temperature ranging from −5° C to 15° C to obtain poly(amide-imide) elastomers of high molecular weight. Of course, the reaction may be carried out at a temperature out of the range described above. However, the molecular weight of the poly(amide-imide) elastomer obtained under such condition is often unsatisfactorily low.

On embodiment of the processes for producing the poly(amide-imide) elastomer according to the present invention is exemplified as follows.

In preparation for the starting materials, an acid anhydride functional polymer (1), a hydroxyl functional polymer (II) is dissolved in a solvent, such as benzene, toluene, xylene, ethyl ether, tetrahydrofuran, chloroform or the like to obtain a homogeneous solution, then a solution of a tricarboxylic acid anhydride monohalide (I) in a solvent described above is added dropwise thereto at a temperature ranging from 0° C to 10° C in the presence of a hydrogen halide acceptor, such as triethylamine, pyridine, picoline, quinoline, N-dimethylbenzylamine, dimethylaniline or the like. In this case, the equivalent ratio of the hydroxyl functional polymer (II) to the tricarboxylic acid anhydride monohalide (I) is ordinarily less than unity, or otherwise about equimolar. The resulting precipitate of hydrogen halide-tertiary amine salt is removed by filtration, and the solvent is evaporated to obtain the acid anhydride functional polymer (1), which is liquid at room temperature or viscous liquid showing fluidity by being heated at most 30° C.

According to the present invention, a poly(amide-imide) elastomer is prepared by using the acid anhydride functional polymer (1) as follows. The acid anhydride functional polymer (1) is added dropwise to a homogeneous solution of a dicarboxylic acid dihydrazide (2) in an aprotic dipolar solvent at a given temperature under stirring. The reaction system becomes viscous as the addition of the functional polymer proceeds. After the completion of the addition, the reaction system is further continuously stirred for 2 to 3 hours, and then quenched to room temperature.

The reaction mixture is poured into a large amount of water to precipitate a white rubbery solid. After throughly washed with water, the resulting polymer is dried over a filter paper to remove water, and then dissolved in tetrahydrofuran. The homogeneous and gel-free tetrahydrofuran solution of the resulting polymer is poured into a large amount of n-hexane to precipitate a white rubbery solid. After twice repeating the purification process composed of dissolving in tetrahydrofuran and precipitating from in n-hexane, the purified polymer is dried in a vacuum oven at 30° C for about 20 hours. By the process described above, a high molecular weight poly(amide-imide) elastomer having a number average molecular weight ranging from 10,000 to 100,000 can be produced.

According to the present invention, the reaction is carried out successfully without catalyst. However, the reaction rate can be accelerated with the use of some kinds of catalysts. As the catalysts, there may be used tertiary amines, such as triethylamine, pyridine, dimethylaniline, N-dimethylenzylamine, 2-(dimethylaminomethyl)-phenol, 2,4,6-tris(dimethylaminomethyl)-phenol, triethylene diamine, 1,8-diazabicyclo[5,4,0]-7-undecane and the like.

According to the present invention, a low molecular weight tetracarboxylic acid dianhydride may be added as an additive to the reaction system in order to improve the physical properties of the resulting poly(amide-imide) elastomer. In this case, it is necessary to limit the addition amount of the additive to equal to or less than equimolar amount based on the acid anhydride functional polymer. When the additive is used in an amount of more than equimolar amount based on the acid anhydride functional polymer, the poly(amide-imide) elastomer obtained is poor in solubility to organic solvents and becomes often organic solvent-insoluble, and furthermore, the imidization reaction at low temperature is apt to be retarded.

As the low molecular weight tetracarboxylic acid dianhydrides, there may be used pyromellitic acid anhydride, benzophenone tetracarboxylic acid dianhydride, pyridine tetracarboxylic acid dianhydride, pyrazine tetracarboxylic acid dianhydride, p-phenylene-bis(trimellitate) dianhydride, ethylene glycol-bis(trimellitate) dianhydride, butanediol-bis(trimellitate) dianhydride, butenediol-bis(trimellitate) dianhydride, divinylethylene glycol-bis(trimellitate) dianhydride, cyclopentane tetracarboxylic acid dianhydride, tetrahydrofuran tetracarboxylic acid dianhydride, butanetetracarboxylic acid dianhydride and the like. Among them, pyromellitic acid anhydride is preferable.

The features of the poly(amide-imide) elastomer and the process for producing the elastomer according to the present invention are that novel, thermoplastic and organic solvent-soluble poly(amide-imide) elastomer is produced by one-step method under mild condition. The poly(amide-imide) elastomer according to the present invention is a useful material for articles of many fields, for example, shaped articles, such as tires and the like, elastomeric films, coating materials, electric insulating materials, laminated structural materials, construction materials, adhesives and various bio-organic functional materials.

The following examples are merely as illustrations of the present invention and it is to be understood that the invention is not limited thereto. In the examples, the part and percent are by weight unless otherwise indicated.

EXAMPLE 1

4.13 g (0.012 mole) of 3,9-bis(2-hydrazidoethyl)-2,4,8,10-tetraoxaspiro[5,5]undecane and 450ml of N,N-dimethyl acetamide (DMAc) were put into a 500 ml three-neck flask equipped with a stirrer and a nitrogen inlet. Then, to the resulting homogeneous solution was added dropwise at 10° C in 30 minutes under stirring 45.87 g (0.012 mole) of an acid anhydride functional polymer which was previously prepared by reacting polyoxytetramethylene glycol (number average molecular weight: 3,570, supplied by Nippon Polyurethane Co.) with trimellitic anhydride monochloride at an equivalent ratio of 1.0/1.0 in the presence of benzene as a solvent and pyridine as a hydrogen chloride acceptor.

The solution viscosity was increased as the acid anhydride functional polymer was added and dissolved thereto. After the completion of the addition, the stirring was continued for 3 hrs. and thereafter the reaction system was stood to room temperature and then quenched. The reaction product was poured into a large amount of water to precipitate a white rubbery polymer.

After washed with a large amount of water, the resulting polymer was dried and purified twice by repeating dissolution of the polymer in tetrahydrofuran and precipitation thereof from a large amount of n-hexane.

The purified polymer was dried at 30° C for 20 hrs. under a reduced pressure of 1 mmHg to obtain 44.7 g (89.3% of conversion) of a clear, tough and elastomeric material.

Since the resulting elastomer was soluble in benzene, toluene and tetrahydrofuran, a tetrahydrofuran solution of the resulting elastomer was produced, and an elastomeric film was prepared by pouring the tetrahydrofuran solution on an KBr plate and by removing the solvent completely under reduced pressure without heating. The infrared (IR) spectrum of the resulting film gave a peak at 3,220 cm$^{-1}$ assigned to secondary amine group, peaks at 1,798 cm$^{-1}$ and 1,748 cm$^{-1}$ assigned to carbonyl group based on imide bonding and peaks at 1,650 – 1,680 cm$^{-1}$ assigned to carbonyl group based on amide bonding, and a peak at 710 cm$^{-1}$ assigned to imide group, while none of the peaks at 1,685 – 1,700 cm$^{-1}$ assigned to carbonyl group based on carboxyl group was observed. From the IR analysis as described above, it is concluded that imidization of the starting materials proceeds easily under the condition of the present invention to form a poly(amide-imide) elastomer.

The intrinsic viscosity of the resulting elastomer measured at 25° C in tetrahydrofuran was 1.33 and the number average molecular weight thereof measured by the osmometric method was 42,300. The imidization percentage was 84.4%, which was measured by titrating carboxyl groups remained in the resulting elastomer dissolved in a benzene-methanol (75:25, volume ratio) solvent with a 0.1N sodium methoxide benzene-methanol (86:14, volume ratio) solution by means of an automatic titrator (RAT-11S (T.W.) type, supplied by Hiranuma Sangyo Co.).

EXAMPLES 2 AND 3

Tough and organic solvent-soluble poly(amide-imide) elastomers were obtained by repeating a similar experiment as described in Example 1, except that adipic acid dihydrazide or isophthalic acid dihydrazide was used instead of the dihydrazide compound used in Example 1.

The yield, intrinsic viscosity and number average molecular weight of the resulting elastomers are shown in Table 1.

Table 1

| Example No. | 2 | 3 |
| --- | --- | --- |
| Dicarboxylic acid dihydrazide | Adipic acid dihydrazide | Isophthalic acid dihydrazide |
| Yield (g) (conversion (%)) | 44.3 (89) | 47.9 (96) |
| Intrinsic viscosity | 0.88 | 0.64 |
| Number average molecular weight | 29,000 | 25,000 |
| Imidization percentage (%) | 80.9 | 66.8 |

EXAMPLE 4

The same experiment as described in Example 1 was carried out, except that dimethyl formamide was used as a solvent instead of N,N-dimethyl acetamide. As a result, 42.5 g of a tough poly(amide-imide) elastomer was obtained (The conversion was 85.0%).

The intrinsic viscosity of the resulting elastomer was 1.03, the number average molecular weight thereof was 37,500, and the imidization percentage was 71.3%.

EXAMPLE 5

The same experiment as deescribed in Example 1 was carried out, except that the equimolar amount of pyromellitic acid anhydride based on the acid anhydride functional polymer was added to the reaction system as a reinforcing ingredient.

That is, 5.81 g (0.017 mole) of 3,9-bis(2-hydrazidoethyl)-2,4,8,10-tetraoxaspiro[5,5]undecane was dissolved in 360 ml of dimethyl acetamide to obtain a homogeneous solution, and then 32.59 g (0.008 mole) of the acid anhydride functional polymer and 1.91 g (0.008 mole) of pyromellitic anhydride were added dropwise at 10° C in 30 minutes thereto. A tough and slightly opaque, pale yellowish poly(amide-imide) elastomer was obtained in a conversion of 92.3% (37.22 g).

It took a long time to dissolve the resulting elastomer in general organic solvents, such as benzene, toluene or tetrahydrofuran, but the elastomer was easily dissolved in an aprotic dipolar solvent or m-cresol. The intrinsic viscosity of the resulting elastomer measured in m-cresol solution at 25° C was 1.23.

When the IR spectrum of the resulting elastomer was measured by the KBr tablet method, there were observed strong peaks at 1,790 cm$^{-1}$, 1,750 cm$^{-1}$ and 710 cm$^{-1}$ assigned to imide group, but almost none of peaks at 1,690 – 1,700 cm$^{-1}$ assigned to carbonyl group based on carboxyl group. From the above results, it is indicated that imidization of the starting materials successfully proceeds at low temperature. Further, when the IR spectrum of an elastomeric film, which was prepared by pouring the above described m-cresol solution of the resulting elastomer on an KBr plate, followed by heat treatment for several hours under pressure to completely remove the solvent, was measured, the obtained IR spectrum was the same as that obtained in the above KBr tablet method. This fact shows that imidization has already proceeded in the course of the reaction of this example without heat treatment.

EXAMPLE 6

An experiment was carried out by repeating the procedure described in Example 1, except that polyethylene adipate glycol EA-2,500 (supplied by Nippon Polyurethane Co., number average molecular weight: 2,448) and trimellitic anhydride monochloride were used for the acid anhydride functional polymer. 34.53 g (conversion 89.2%) of an opaque and pale yellowish poly(amide-imide) elastomer was obtained. The intrinsic viscosity of the elastomer was 0.92 and the imidization percentage was 87.4%.

EXAMPLE 7

An experiment was carried out by repeating the procedure of Example 1, except that a liquid hydroxyl functional polybutadiene having a number average molecular weight of 2,100, which was obtained by ozonizing commercially available cis-1,4-polybutadiene (BR01, supplied by Japan Synthetic Rubber Co., number average molecular weight: about 110,000) and by reducing the resulting ozonide with bis(2-methoxyethoxy) sodium aluminum hydride (NaAlH$_2$(OCH$_2$CH$_2$OCH$_3$)$_2$), was used for the acid anhydride functional polymer instead of polyoxytetramethylene glycol. 28.60 g (conversion: 85.9%) of an opaque and slightly reddish brown poly(amide-imide) elastomer was obtained.

The intrinsic viscosity and number average molecular weight of the elastomer and the imidization percentage were 0.72, 19,000 and 82.7%, respectively.

COMPARATIVE EXAMPLES 1 AND 2

Experiments were carried out by repeating the procedure of Example 1, except that diamine compounds, such as 4,4'-diaminodiphenylmethane and 3,9-bis(3-aminopropyl)-2,4,8,10-tetraoxaspiro[5,5]undecane, were used instead of the dicarboxylic acid dihydrazide used in Example 1, to give pale yellowish or yellowish brown and slightly opaque elastomers.

Films of the resulting elastomers were prepared in the same manner as described in Example 1, and the IR spectra of the films were measured. In the IR spectra, there were observed a peak at 3,260 cm$^{-1}$ assigned to secondary amine group, a peak at 1,685 cm$^{-1}$ assigned to carbonyl group based on carboxyl group and a peak at 1,655 cm$^{-1}$ assigned to carbonyl group based on amide group and observed almost none of peaks at 1,780 cm$^{-1}$, 1,735 cm$^{-1}$ and 720 cm$^{-1}$ assigned to imide group.

The yield and intrinsic viscosity of the resulting elastomer and the imidization percentage are shown in Table 2.

Table 2

| Comparative Example No. | 1 | 2 |
|---|---|---|
| Diamino compound | A | B |
| Yield (g) | 34.2 | 31.6 |
| (conversion (%)) | (85.5) | (79.0) |
| Intrinsic viscosity | 0.81 | 0.57 |
| Imidization percentage (%) | 14.6 | 11.9 |

Note:
A: 4,4'-diaminodiphenylmethane.
B: 3,9-bis(3-aminopropyl)-2,4,8,10-tetraoxaspiro[5,5]undecane.

Furthermore, when the elastomers obtained were heated at 150° C for 10 hrs. under a reduced pressure of 1 mmHg, the elastomers were discolored to brownish. The IR spectra of the discolored elastomers were measured in the same manner as described above. In the IR spectra, there were observed almost no peaks at 3,260 cm$^{-1}$ assigned to secondary amine group, at 1,685 cm$^{-1}$ assigned to carbonyl group based on carboxyl group and at 1,655 cm$^{-1}$ assigned to carbonyl group based on amide group, but observed intensive peaks at 1,780 cm$^{-1}$, 1,735 cm$^{-1}$ and 720 cm$^{-1}$ assigned to imide group. This shows that the polyamic acid elastomer has changed into a polyimide elastomer through a ring-closure reaction of the carboxyl group of polyamic acid elastomer by the heat treatment.

The results of alkaline titration of imidization percentage after the heat treatment are shown in Table 3.

Table 3

| Comparative Example No. | 1 | 2 |
|---|---|---|
| Imidization percentage (%) | 95.5 | 91.4 |

From the comparison of Comparative Examples 1 and 2 described above with Examples 1 to 7, it is concluded that according to the present invention the imidization reaction proceeds effectively under mild reaction condition to form a novel poly(amide-imide) elastomer.

What is claimed is:

1. A process for producing poly (amide-imide) elastomer having a number average molecular weight ranging from 10,000 to 100,000, which comprises reacting (1) an acid anhydride functional polymer represented by the following formula

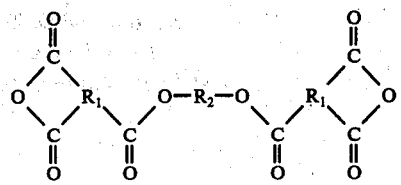

wherein R$_1$ represents a trivalent hydrocarbon radical having at least 2 carbon atoms and R$_2$ represents a hydroxyl functional polymer radical having a number average molecular weight ranging from 700 to 10,000 selected from the group consisting of polyether glycol, polyester glycol, polyester ether glycol, poly olefin glycol radicals, and a polyol radical which is obtained by the ozonization of a poly unsaturated hydrocarbon having unsaturated double bond units in the main or side chain, followed by the reduction of the resulting ozonide product with reducing agent,
with (2) a dicarboxylic acid dihydrazide in the presence of an aprotic dipolar solvent at a temperature ranging from $-10°$ C to 30° C, the equivalent ratio of said acid anhydride functional polymer (1) to said dicarboxylic acid dihydrazide (2) being from 0.95 to 1.05.

2. A process for producing poly(amide-imide) elastomer having a number average molecular weight ranging from 10,000 to 100,000, which comprises reacting (1) a mixture of an acid anhydride functional polymer represented by the following formula wherein R$_1$ represents a trivalent hydrocarbon radical having at least 2 carbon atoms and R$_2$ represents a hydroxyl functional polymer radical having a number average molecular weight ranging from 700 to 10,000 selected from the group consisting of polyether glycol, polyester glycol, polyester ether glycol, polyolefin glycol radicals, and a polyol radical which is obtained by the ozonization of a poly unsaturated hydrocarbon having unsaturated double bond units in the main or side chain, followed by the reduction of the resulting ozonide product with reducing agent, and a tetracarboxylic acid dianhydride,
with (2) a dicarboxylic acid dihydrazide in the presence of an aprotic dipolar solvent at a temperature ranging from $-10°$ C to 3° C, the equivalent ratio of said tetracarboxylic acid dianhydride to said acid anhydride functional polymer (1) being not more than 1.0, and the equivalent ratio of said mixture to said dicarboxylic acid dihydrazide (2) being from 0.95 to 1.05.

3. The process according to claim 1, wherein R$_1$ in said acid anhydride functional polymer (1) is selected from the class consisting of phenyl, biphenyl, diphenylmethane, diphenylethane, diphenylpropane, diphenylether, benzophenone, and pyrazine radicals.

4. The process according to claim 1, wherein the polyester glycol is selected from the class consisting of polyethylene adipate glycol and polyethylene phthalate glycol.

5. The process according to claim 1, wherein the polyolefin glycol radical is selected from the class consisting of polybutadiene glycol and polyisoprene glycol.

6. The process according to claim 2, wherein the tetracarboxylic acid dianhydride is selected from the class consisting of pyromellitic acid dianhydride, benzophenone tetracarboxylic acid dianhydride, pyridine tetracarboxylic acid dianhydride, pyrazine tetracarboxylic acid dianhydride, p-phenylene-bis(trimellitate) dianhydride, ethylene glycolbis(trimellitate) dianhydride, butanediol-bis(trimellitate) dianhydride, butenediol-bis(trimellitate) dianhydride, divinylethylene glycol-bis(trimellitate) dianhydride, cyclopentane tetracarboxylic acid dianhydride, tetrahydrofuran tetracarboxylic acid dianhydride, butane tetracarboxylic acid dianhydride and their mixtures.

7. The process according to claim 6, wherein the tetracarboxylic acid dianhydride is pyromellitic acid dianhydride.

8. The process according to claim 1, wherein the dicarboxylic acid dihydrazide is selected from the class consisting of aliphatic dicarboxylic acid dihydrazide, aromatic dicarboxylic acid dihydrazide, alicyclic dicarboxylic acid dihydrazide, dicarboxylic acid dihydrazide containing heterocyclic group and their mixtures.

9. The process according to claim 8, wherein the aliphatic dicarboxylic acid dihydrazide is adipic acid dihydrazide.

10. The process according to claim 8, wherein the aromatic dicarboxylic acid dihydrazide is isophthalic acid dihydrazide.

11. The process according to claim 8, wherein the dicarboxylic acid dihydrazide containing heterocyclic group is 3,9-bis(2-hydrazidoethyl)-2,4,8,10-tetraoxaspiro[5,5]-undecane.

12. The process according to claim 1, wherein the equivalent ratio of the acid anhydride functional polymer (1) to the dicarboxylic acid dihydrazide (2) is 1:1.

13. The process according to claim 1, wherein the acid anhydride functional polymer is reacted with the dicarboxylic acid dihydrazide at a temperature ranging from $-5°$ C to $15°$ C.

14. The process according to claim 1, wherein the aprotic dipolar solvent is selected from the class consisting of dimethyl formamide, diethyl formamide, dimethyl acetamide, diethyl acetamide, N-methyl-2-pyrrolidone, N-ethyl-2-pyrrolidone, hexamethyl phosphorotriamide, dimethyl sulfoxide, acetonitrile, benzonitrile, nitromethane, nitroethane, nitrobenzene, sulfolane and their mixtures.

* * * * *